(12) United States Patent
Xu et al.

(10) Patent No.: US 8,930,940 B2
(45) Date of Patent: Jan. 6, 2015

(54) ONLINE SOFTWARE EXECUTION PLATFORM

(75) Inventors: Yongyong Xu, Sunnyvale, CA (US);
Dan Li, Sunnyvale, CA (US)

(73) Assignee: YongYong Xu, Sunnyvale, CA (US)

( * ) Notice: Subject to any disclaimer, the term of this patent is extended or adjusted under 35 U.S.C. 154(b) by 118 days.

(21) Appl. No.: 13/213,365

(22) Filed: Aug. 19, 2011

(65) Prior Publication Data
US 2013/0047149 A1 Feb. 21, 2013

(51) Int. Cl.
*G06F 9/445* (2006.01)
*G06F 21/53* (2013.01)
*G06F 9/44* (2006.01)
*H04L 29/08* (2006.01)

(52) U.S. Cl.
CPC . *G06F 9/445* (2013.01); *G06F 8/76* (2013.01); *G06F 8/61* (2013.01); *H04L 29/08981* (2013.01); *G06F 8/60* (2013.01); *G06F 21/53* (2013.01)
USPC .......................................... 717/175; 717/178

(58) Field of Classification Search
CPC ............... G06F 8/60; G06F 8/61; G06F 8/62; G06F 8/63; G06F 8/65; G06F 8/71; G06F 9/445; G06F 9/4411; H04L 29/08981

USPC .......................................................... 717/175
See application file for complete search history.

(56) References Cited

U.S. PATENT DOCUMENTS

| | | | |
|---|---|---|---|
| 6,725,238 B1* | 4/2004 | Auvenshine ........................ 1/1 |
| 6,848,075 B1* | 1/2005 | Becker et al. ................. 715/205 |
| 7,404,177 B1* | 7/2008 | Greenfield et al. ........... 717/106 |
| 7,640,153 B2* | 12/2009 | Bala et al. ....................... 703/20 |
| 7,895,566 B2* | 2/2011 | Shenfield et al. ............. 717/107 |
| 8,326,941 B2* | 12/2012 | Aviles Sanchez et al. .... 709/217 |
| 2008/0066078 A1* | 3/2008 | Rathod et al. ................. 719/311 |
| 2009/0055749 A1* | 2/2009 | Chatterjee et al. ............ 715/738 |
| 2009/0300594 A1* | 12/2009 | Kozhukh ....................... 717/168 |
| 2011/0119143 A1* | 5/2011 | Head et al. ................... 705/26.1 |
| 2011/0231488 A1* | 9/2011 | Xu ................................. 709/204 |

* cited by examiner

*Primary Examiner* — Qing Chen
*Assistant Examiner* — Andrew M Lyons

(57) ABSTRACT

A system and method for a new type of software repository and remote execution solution where any native application can be run from within a web page is disclosed. Users now have a much easier way to launch, run or execute any software directly from within a server or server cloud without the need to manually download and install. The system further allows software to run inside an isolated environment to protect user's local environment.

17 Claims, 12 Drawing Sheets

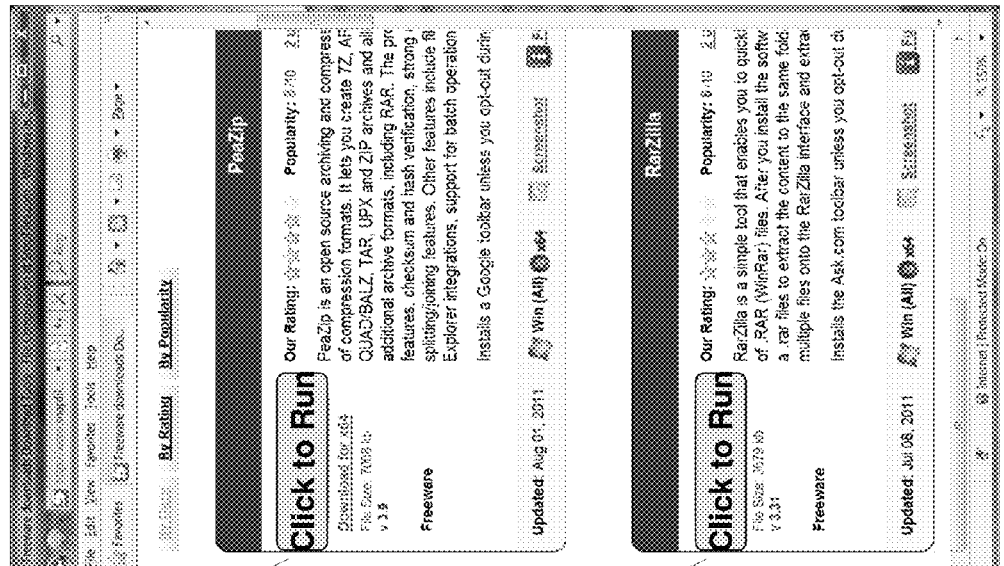

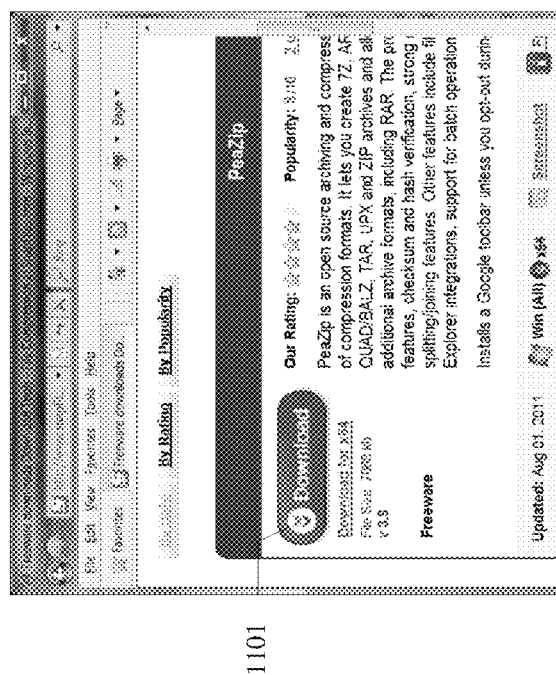
Fig. 11

ONLINE SOFTWARE EXECUTION PLATFORM

BACKGROUND OF THE INVENTION

1. Field of the Invention

The present invention relates to software execution and more particularly to a system and method of executing software from the Internet.

2. Description of Related Art

The Internet has become part of everyone's life now. At present, almost everything can be accessed online: business, entertainment, sales, music, video, and various social networks. In most cases, a user browses an Internet site, simply clicks a hyperlink to search the web, browse the Internet, listen to music, watch video, chat with others, or connect to a social network. In summary, almost all the activities are already online accessible, however, software using techniques remain in the old-fashioned way.

Traditionally, software packages, by design, cannot be directly launched from the web. For example, in a desktop environment like Windows™ or Mac OS™, before a software can be used, the user has to first download the installation package for the software, then install a copy of the software into his/her local machine. Only after the software package is installed in the local machine can the user see the application icon to click to start the software. Many times, such process is not only time consuming, but also non-trivial for a nontechnical person, so there is a need to allow any person to start, launch or run any software directly from the web without such hassle in the current Internet era.

Most software package come with different types of license which are also part of the reason for installation needs. Traditionally, during software installation, the user of software has to accept a license agreement in order to allow the installer to continue installing the software into the user's local machine. Multiple types of software licenses have been put in use, ranging from freeware, adware, shareware, trialware to commercial licenses such as license per user, license per machine or license per company.

However, most existing software licenses, even commercial licenses, cannot accurately reflect the real usage of the product because it is really hard to track the real usage of a software product. In many times, once a software has been installed, the user is able to run it as many times as possible, unless the software installer puts extra efforts to pose some limitation. There is also a need for a generic method and approach to simplify the software license grant process as well as a generic way to accurately charge software product by its true usage.

Even for software that does not need to be installed, such as "green" software, it still need to be packaged into some kind of special bundle or zip file to be easily transferred and downloaded as one file in the Internet. It is the end user who receives the package that need to manually unzip or unpack the package to a local directory of the client's machine in order to use it. This is also not convenient and there is also a need for a generic system and method to automatically download, unzip and launch such software for a user without user intervene.

Furthermore, once a user has used a software once, it is permanently installed into the user's local machine and occupies precious hard disk space. In order to remove the software, the user has to manually start an application manager from control panel, and select the particular software to uninstall. During the process, the user is usually prompted with several questions to confirm and accept the operation. Such task is highly technical and time consuming as well, so there is also a need to automatically manage the software lifecycle in a user's local machine, for instance, to automatically free spaces from unused software when there is lack of space without user's intervene.

Another issue associated with software installation is that some software installers are so aggressive that, once installed, they hook themselves into the system and make them either auto-start during system boot, or hide themselves and become very difficult to be detected by the system, or very hard to be removed from the local machine.

Computer virus, spyware, certain adware, malware or badware may fit into this category. Many of them do not contain uninstallers—once installed, average users have no idea how to remove or uninstall at all without reinstalling the whole system. So, in order to deal with such scenarios, there is a need for a standard method or approach to effectively manage all types of software.

In a LAN environment like corporate network, some software, with special design, can be installed in a common file server so that everyone in the network can share single installed software. This is called networked install. However, in a WAN network environment such as the Internet, this approach has not gain popularity because there are significant differences between WAN and LAN, such as network topology, bandwidth, availability, cost, security and standard.

Traditionally, in order to install software package, all parts of the package need to be downloaded into the user's local machine before installation. However, most big software suites, such as Microsoft Office, may have over hundreds of megabytes to gigabytes in size and contain thousands of features, of which only a small portion may be actually used by a user. Therefore, in order to allow user to use the software as soon as possible, it needs a system and method to start software without downloading all parts of the software.

All in all, traditional software usage and installation processes do not fit well in the current Internet era. Software as a service, or SaaS, with noticeable example of Salesforce™, is a software delivery model where software is hosted in the web server and allows users to use them directly from the browser. SaaS can be used in cloud computing.

However, in order to use the SaaS, software must be re-written completely into a browser-server model so that core parts are run inside the server which provide browser interface for user to access. Traditional or existing desktop software cannot be directly used in the SaaS model. For example, online emails like Hotmail™, Yahoo™ mail are completely different from desktop email client like Outlook™, online office like Google™ docs needs completely re-written.

In order to fully utilize the power of cloud computing and SaaS, client software needs to be turned into a true software-as-a-service.

This application will present generic ways to allow existing software to launch, run and execute directly from the web and to overcome shortcomings of the traditional software installation outlined above.

SUMMARY OF INVENTION

The system and method of the invention provides a generic solution that allows any person to start, launch or run existing software directly from the web, without manual tedious download and installation steps.

In accordance with an aspect of the invention, the system and method further simplifies software license granting process and can accurately measure software usage and further associate the usage with license royalties or various fees. In this way, people who only use a big software suite occasionally (such as Microsoft Office™) do not need to pay full license fee beforehand because it is fairer to the customer and the software developer to pay by usage. In the long run, it can also discourage and reduce software piracy because people now can freely use far more software with far less cost.

In accordance with another aspect of the invention, the system and method also provides an effectively way to manage all types of software to avoid malwares to spread into the local system. For instance, users shall be able to choose whether they want to run the software as needed without persistence, or, even persisted into the local machine, can still be easily purged on demand or automatically without manual involvement.

In accordance with another aspect of the invention, the system and method allows a user to launch, use or execute any existing software in a secured sandbox which prevent the software to peep, harm or damage other parts of the local system.

In accordance with another aspect of the invention, the system and method provide generic approach for user to launch and execute a software or application targeted for a different operating system or environment, by dynamically converting an alien software to a local application and providing an emulated alien environment which maps the operations to the local system in real time.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of functional components and to the arrangements of these components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent constructions insofar as they do not depart from the spirit and scope of the present invention.

These and other aspects and features of the present invention will become apparent to those ordinarily skilled in the art upon review of the following description of specific embodiments of the invention in conjunction with the accompanying figures, wherein:

BRIEF DESCRIPTION OF THE DRAWINGS

FIG. 11 shows a download web page being dynamically converted into a click-to-run page.

DETAILED DESCRIPTION

The present invention will now be described in detail with reference to the drawings, which are provided as illustrative examples of the invention so as to enable those skilled in the art to practice the invention. Notably, the figures and examples below do not limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Figure 1:
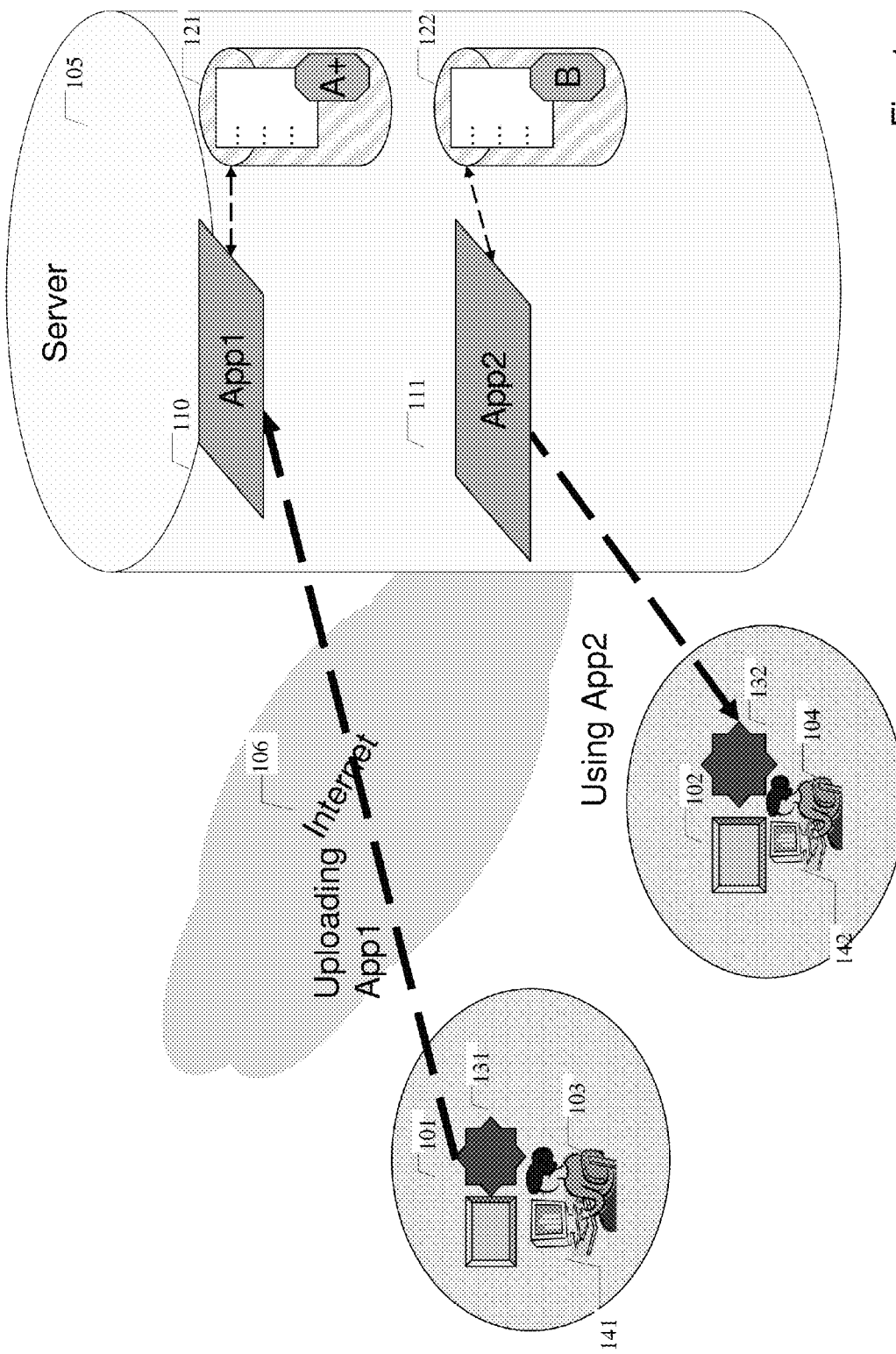
FIG. 1 is a general overview of this online software execution environment.

FIG. 1 is a general overview of this online software execution environment.

In accordance with the invention and as shown in FIG. 1, the developer 103 can upload software to the server 105 of the system. During this process, the system prepares or processes the software into the package 110 that is more suitable for running over the Internet 106. The package 110 and 111 can be loaded on-demand when user 104 wants to run it. The system keeps the prepared software packages 110, 111 into remote repositories 121, and 122 in the server side or in a cloud environment and make them publicly accessible. Later on, user 104 can start the browser 102, and browse to the server, he can select from a list of all available packages and click one to run.

When the user 104 clicks the selected software package 111, a client side component 132 which is integrated with the local browser 102 can work together with the server component 105 to automatically cache part of the software to the client's local machine 142 and execute the software locally. If more files are needed as the application 111 runs, the component 132 can help to download the needed parts on demand, thus can eliminate the need to download all parts of the software package all at once.

During software launching process, the system needs to first check if the client's local machine 142 already contains necessary files and data to start the software locally. If not, the system, or the client side component 132 needs to fetch the necessary parts (files or data) from the remote server repository 122. Later on, during the execution of the software, if the software requires more components, files or data that is not yet currently available in the local machine, the system shall be able to retrieve and cache the missing parts automatically without the need of whole software install.

In this way, only a small portion of the software package immediately needed during the execution is fetched in the beginning, which saves huge amount of downloading and initialization time. All the rest files, such as help files, documentations, extra plugins will be downloaded only when the features are explicitly used or requested at later time. If those features are seldom used, there is no need to fetch and install those files at all and can save lots of bandwidth, loading time and user's disk space.

Once the software package finishes running, components, files or data that already getting downloaded or installed to the local machine can then be kept in cache and used the next time, This can greatly increase the speed for the following launches since all needed files and data already exist in the user's local disk space and does not need to be re-downloaded from the server again. Later on, in case there is not enough disk space available in the user's local machine, space occupied by the least used software packages can be released.

Typically a complete software package contains many components, files and data and uses special designed installation component (installer) to install it into the local system. Most operating systems have their own specific mechanism for software installation and installers perform lots of interactions with the operating system during the process of software installation.

For example, In Microsoft Windows™, an installer needs to create all the necessary folders in the file system; copy the executable and other data files to the file system; register the software to the system registry; create shortcut for the application in users' desktop or start menu. Sometimes, the installer will also create file type associations for the application or create auto-start links and driver entries for the application.

In Linux or other Unix based systems, software is packaged into a special bundle. During the installation, the bundle is unpacked and copied to various parts of the file system, such as /etc, /usr/bin. In addition, the installer may also update information through a central software registration service for the installed package.

Some mobile operating systems also use the similar approach. For example, in Android™ operating system, a specially designed .apk file is used to install the application package to the local device. During the installation, the apk file is unpacked, examined and saved to the local device's file system and then the central software repository in the device is updated to reflect the change.

Conventionally, almost all software package available in the Internet is packaged into a special file that needs manual installation, even for "green" software which is a simple zipped file. Traditionally, it is the end user who has to download the file, unpack or execute the installer before the real launch.

In order to eliminate the manual work for a user and to allow delivering an application to a remote computer in a more automatic way, the client side component need to work around the installer and automatically setup for the user.

A easy solution is to use the installer package as is and perform the setup and installation in the background on the first run. For example, when a user selects an application to run, the system automatically downloads the installation package to the local machine and starts the silent installation in the background. After installation, the system automatically starts the application. One advantage of this approach is that it is simple to implement. The disadvantage is that for large packages, the installation package may be too big to download since everything may need to be installed all at one. Another disadvantage is that since the software is installed directly to the local machine, it needs to be removed later through the uninstall interface of the local system.

To reduce the initial download file size, the system can repack, or create an image that is more suitable to allow application to be executed directly. In order to generate this file, the system needs to monitor the changes to the local system made by the installer during the regular software installation. The steps are outlined as in FIG. 2.

Figure 2:
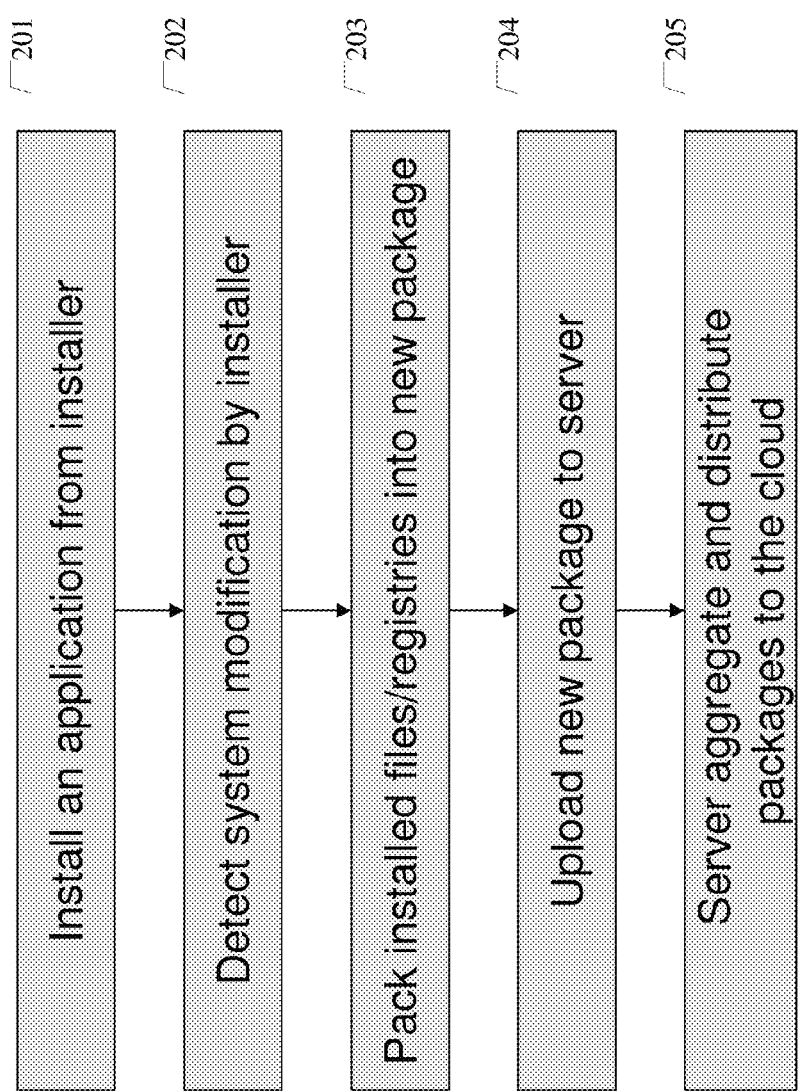
FIG. 2 shows the process for creating a new package from the software installer by detecting system changes.

FIG. 2 shows the process for creating a new package from a software installer by detecting system changes.

As shown in FIG. 2, a developer can submit his own application to the server, typically, in the form of an application installer for a targeted operating system. When the server needs to repack the application to make it more suitable to run from the web, the system may first run the application installer as shown in step 201. The installer can be run either in the developer's local machine, a virtual machine or a remote machine in the server side.

When the installer starts to install files and/or make changes to the target machine, a system module detects modifications made by the installer in step 202 and then packs those new changes (like files, data, and other components) into a new package in step 203 before uploading the package to the server as shown in 204. The server may further distribute changes to a cloud as in 205 and then the package is ready to be downloaded and used by other users.

To detect changes made by the installer, at least the following possible methods can be utilized.

If the application installer has a fixed and well-known format and structure, the system can easily extract needed files from the installer package and save them into the system. For example, if it is a Java package file like the .jar or .zip file, this is a simple solution.

Otherwise, a second approach is to run the application installer and compare the local disk image and other system component states before and after the run of application installer to detect changes made by the application installer. To reduce the memory and disk usage, the system may limit the comparison to certain commonly used folders and register entries, such as Program Files folder, system folders in Windows operating system.

Yet another approach is to create the package by hooking up system calls from the application installer. When a developer submits an installer package, the system first setup a system call hooker and then starts the application installer with all critical system calls being monitored or watched during the installation. Later, as the installer writes files to disks, makes changes to the registry or another part of the system, the monitor can intercept those calls, record those actions and save the result into the final package. Through this way, we can easily get a complete image of all new information (files, registries, data, components and so on) as if the package were directly installed into the targeted machine.

Figure 3:
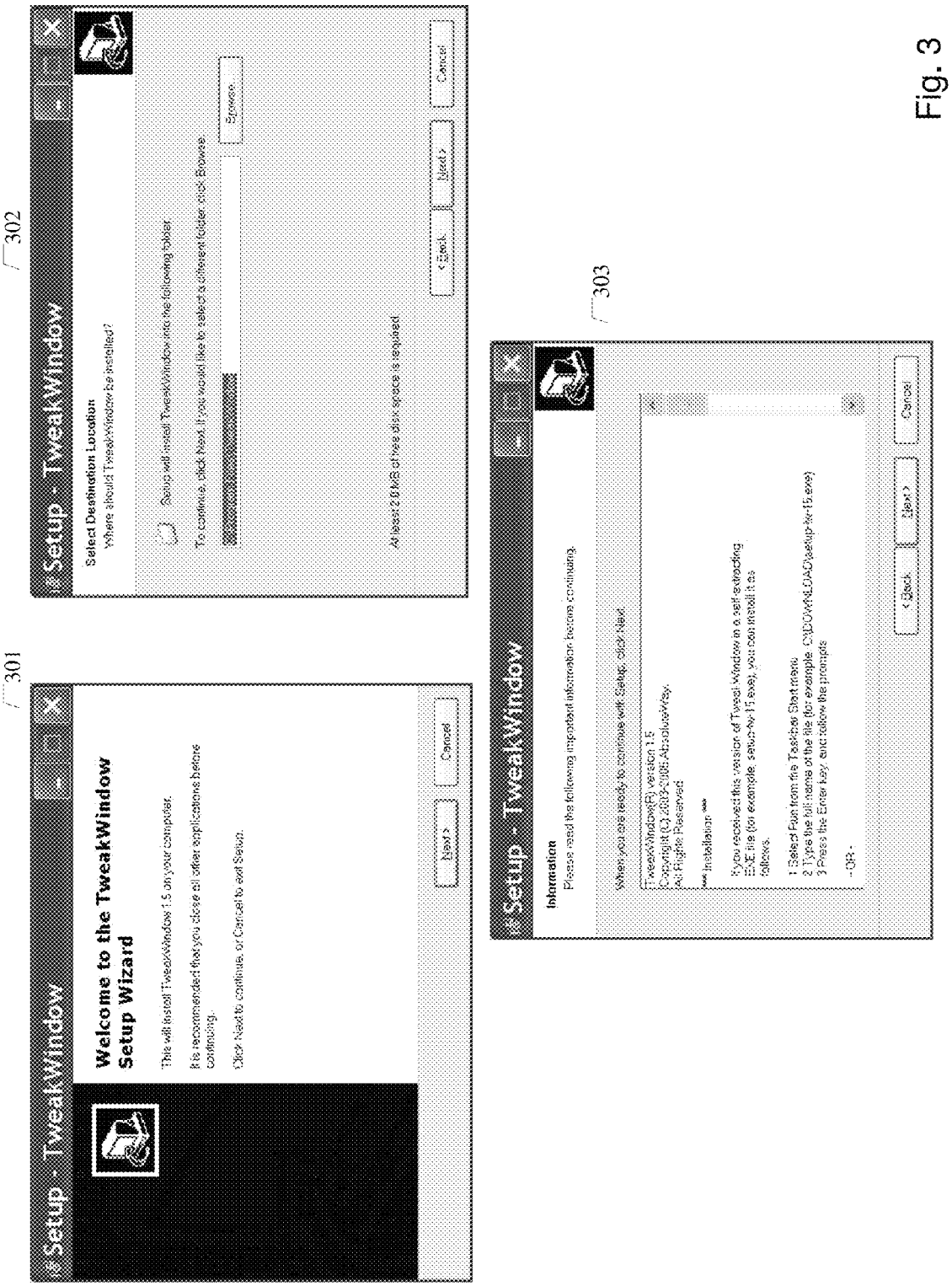
FIG. 3 shows screenshots of running the original application setup or installer with a monitor.

FIG. 3 shows screenshots of running the original application setup or installer with a monitor.

In FIG. 3, the monitor shows a red frame surrounding the setup window designating that the installer is being monitored. The user still runs the setup the same as a normal application installation, including pressing next button 301, entering installing folder 302 and granting the license 303. The main purpose of the monitor is to find out system changes made by the installer.

In one embodiment of the system, the setup or installer can be run in an automated mode such as silent installation where all install configurations are default without manual override. In this way, the setup process can be totally automatic without user involvement. In additional, since different applications may use different licenses, in this stage, the system, or the monitor can automatically extract specific license agreement from then installer and then prompt for the actual user to accept at a later stage. To further simplify the license agreement issue, when laws permitting, the system may ask each user to grant the auto-license agreement that implies automatically accepting each and all licenses required to run in this system. The acceptance of this auto-license allows the user to access and run each and every license agreement from various software or applications without the burden to click and accept each of them. Of course, if needed, a developer may still opt to the original, explicit license agreement for certain applications.

Figure 4:
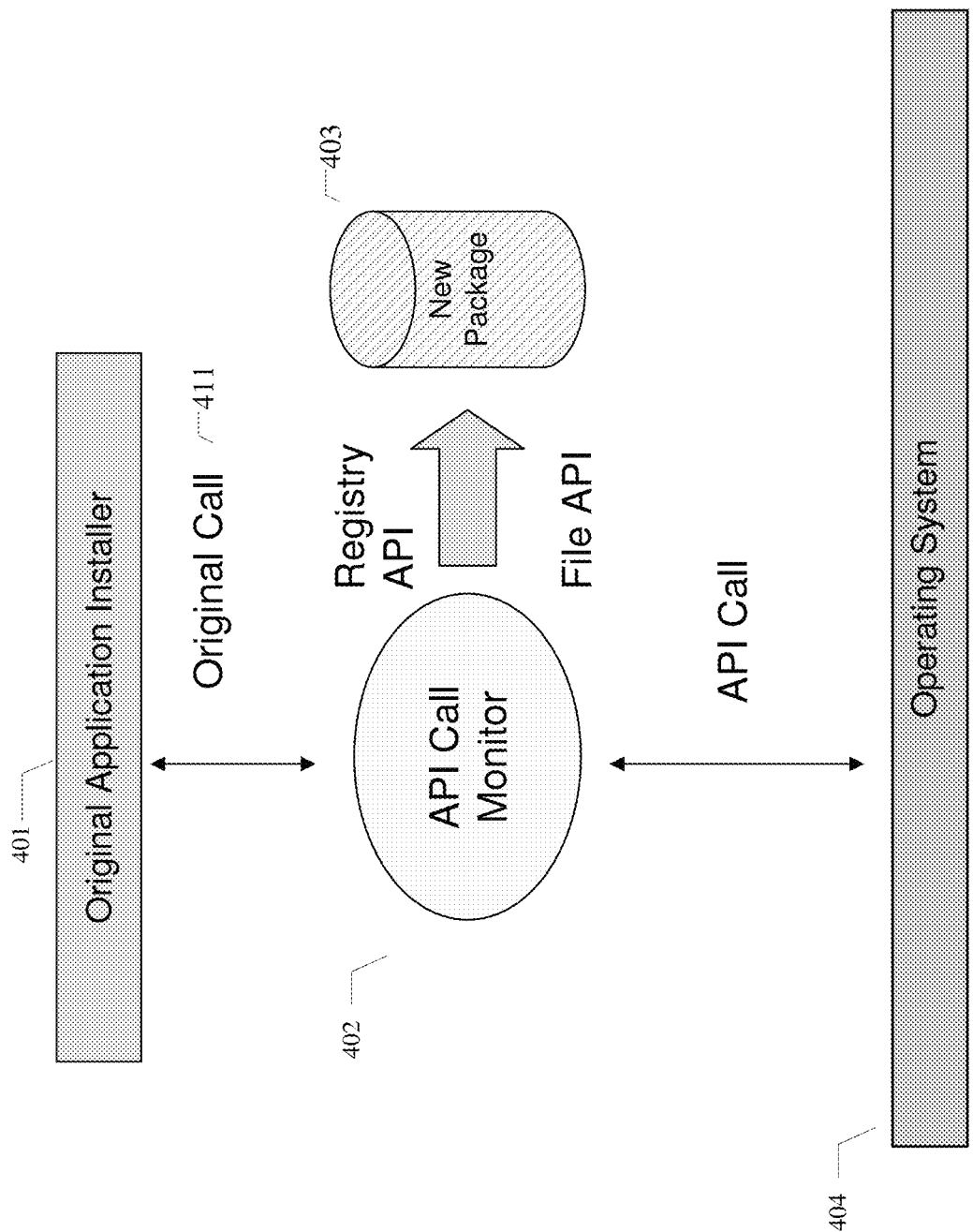
FIG. 4 shows the diagram of monitoring system changes from an arbitrary application installer by hooking system API calls.

FIG. 4 shows the diagram of monitoring system changes from an arbitrary application installer by hooking system API calls.

In FIG. 4, the original application installer 401 made system call 411 to the operating system 404. The call 411 is intercepted by the monitor component 402 which also records the system changes made by the installer and generates the new package 403 based on the semantics and results of the API call 411.

In addition, the monitor, with the hooked layer, could also change the results of system calls to fool the installer. It can be used to simulate a different targeted operating system. For instance, when the installer is calling a system API to detect current OS version, the monitor can return an old version even though the current running OS is a new version. Or, when the installer is calling an API requesting for the current time zone or location, the monitor can return a different time or location other than the real one returned by the underlying operating system. In this way, in case the same installer may behavior differently in different runtime environment, the monitor can be configured to emulate multiple target environments for the installer to create corresponding packages for multiple targets.

Furthermore, rather than hooking and intercept system API calls in order to capture the changes made to the file system or registry during the installation, the monitor can setup a virtual file system or virtual registry to capture the modified system parts and convert them directly into the new package or bundle. The use of virtual system drivers may require administrative privilege in some environment.

Figure 5:
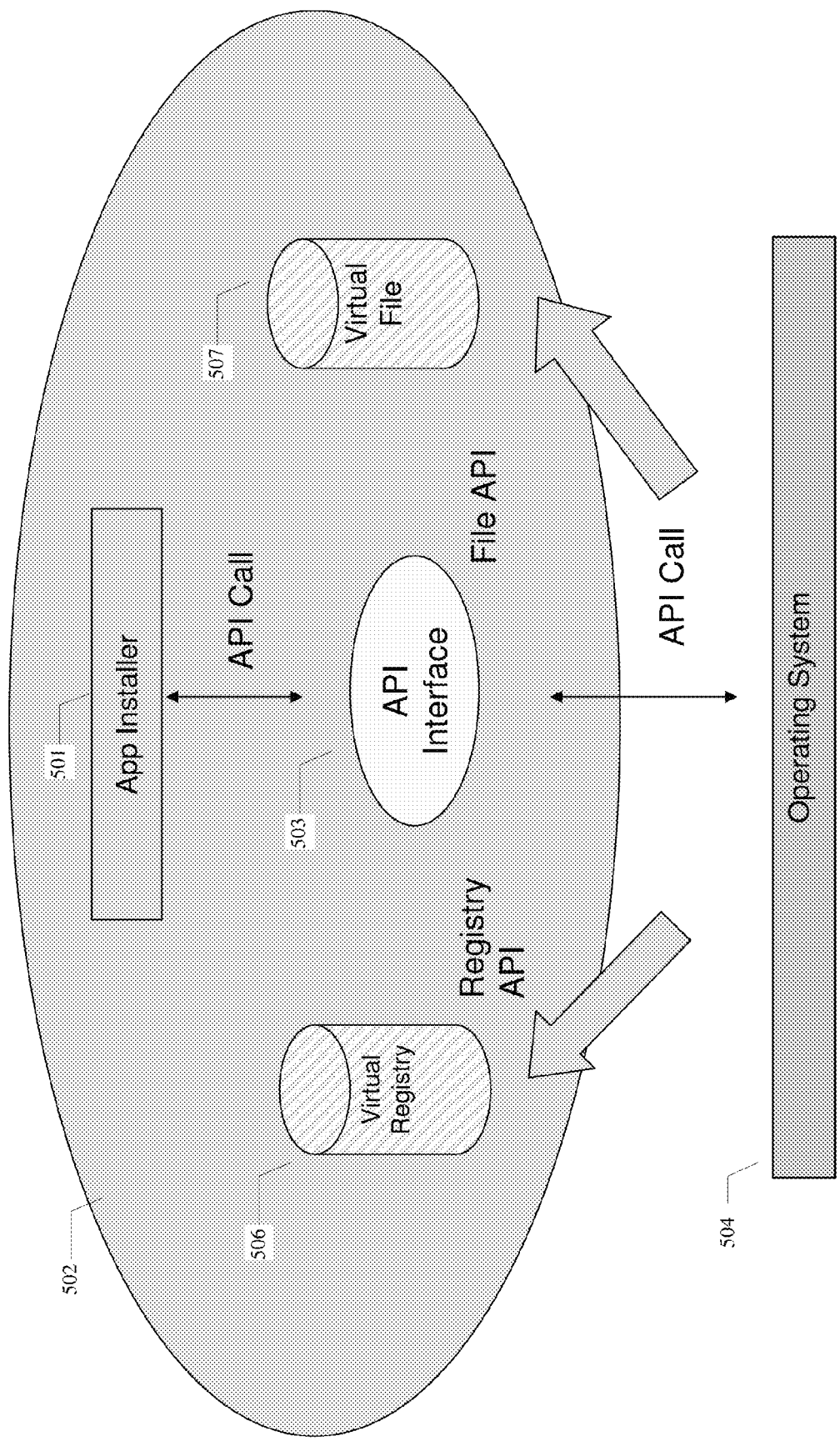
FIG. 5 shows the diagram of a virtual file or registry environment in the monitor to detect system changes made by the installer.

FIG. 5 shows the diagram of a virtual file or registry environment in the monitor to detect system changes made by the installer.

In FIG. 5, when application installer 501 writes to a file system, its content is redirected to the virtual file system 507; and the operation to modify system registry is redirected to the virtual registry 506. This approach is sometimes more efficient as it does not leave debris in the local file system and the API calls can be executed directly by the underlying OS and it is the underlying OS that sends back the changes to the virtualized files, virtual registries or other virtual system components.

Yet another approach is to use virtual machine technology to create the new package by running the application installer inside a virtual machine environment. Either the new VM (virtual machine) image or the changes to the VM can be used to in the future. Because a virtual machine is an isolated environment, everything a software installer changes or modifies during the installation process is eventually recorded in the virtual machine image and does not affect the local machine.

Once created from the original application installer, the new package represents an installed image for the targeted environment shall be able to copy to any new machine to launch the application. In the future, when another user wants to run the software, the system needs to deliver the new package with minimum download rather than waiting for every part to finish downloading.

Figure 6:
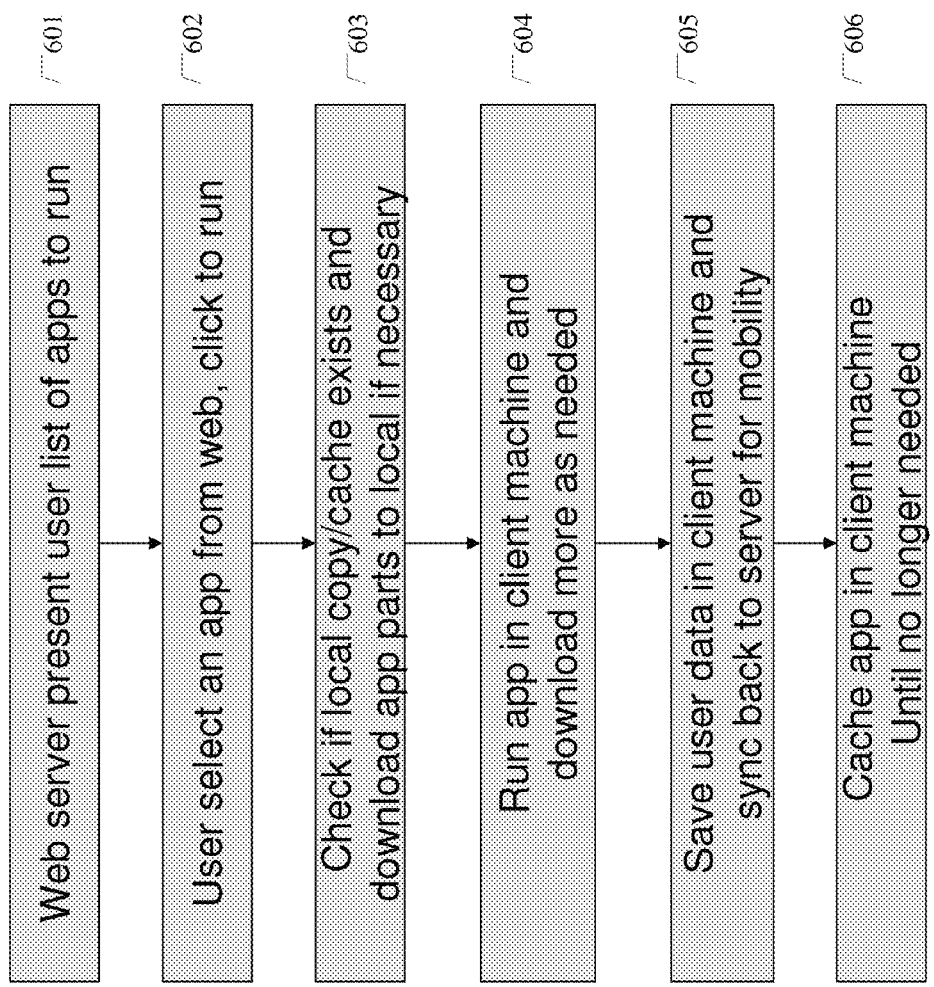
FIG. 6 shows the process for a user to execute a program from the system.

FIG. 6 shows the process for a user to execute a program from the system.

In FIG. 6, the web server first presents a user a list of applications to run (601), after the user clicks an application to run (602), the system checks if there is a local copy or cache of the application already exists in the local machine, if not, the system will cache the necessary parts (603), then the system will execute the program inside the user's local machine (604), during this process, more files may be downloaded if needed, and also user generated files, or changes made to the local machine are kept local and may be optionally synced back to server (605). After run, previously used files and data are kept in the local cache (606) for next time use before explicit or implicit purging.

One means to speedup the application launching is to use a networked file system for the bundled image. In this case, every remote bundle is mapped to a networked file system into user's local machine and the local machine uses the remote file as a networked file system or web drive. However, in order to achieve better response time and be more efficient in the Internet, the networked file system can be further modified or improved over traditional network file system in the following means.

In this configuration, a system component sets up a mapping from remote server bundle to the local file system so that files inside the bundle is initially visible from local machine but the contents of the files are not downloaded to the local machine until they are actually used by a program through operations like open, read, or write. Then the needed contents are transferred from the remote server and cached locally. The local cache shall be permanent across sessions.

This is the first major improvement over traditional network file system because typical network file system is block based and the cache is transitory and is cleaned or discarded after each session. However, in our system, the local cache can be file based and can survive across multiple user sessions because the files may be used by the user in the future. In other words, the local cache maybe "semi-permanent" rather than temporarily.

Semi-permanence allows the system to immediately launch the application from local cache without re-transferring from the remote server the next time the user runs the same package, even when it is offline at the time. Of course, size of the local cache can be determined by the storage capacity or the user preference.

A second improvement can be that the networked file system is not simply mounted to a single mount point, like a network drive (C:, D:, etc) in Windows or particular directory under Linux/Unix file system. Instead, it could be an overlap on top of the existing file system. This has an advantage in that the software or application can still work without modification even when the bundle image spreads across multiple files, across different directories, or even read only system drives.

Another improvement could be that in this networked file system, the local cache can share files from different bundle based on the content of files. For example, when one package uses a common dynamically linked libraries (All or .so file) and gets the file downloaded, another bundle uses the same file but with a different name in different folder, the system will still be able to discover the fact that one of such file already existed in the local cache and there is no need to re-download.

This can be implemented in the local cache where files are referred internally by content (data) other than its name, for example, by a kind of hash code over the content, such as the MD5 hash. When a new file is needed but not available in the client side, the networked file system can first get the hash code of the file content from the remote server and then check if there is already a file with the same content. If yes, rather than re-downloading the file again, the system simply remaps the locally cached file to the new file. Only when a file is being modified then it forks a new version with different hash code. In this way, not only different bundles can share files, same application package with different release versions can also benefit more since in this case, there might be more files share the same content.

Yet another variation occurs when the networked file system saves modified files to its own local cache instead of the remote file system. Traditional network file system (such as like NFS) either mounted as read-only mode, where the operating system generates write error on any write operation to files; or mount as write-able mode, where the write operation is propagated back to the server side. On the contrary, since the remote bundle image is being shared by multiple users, data on the remote data cannot be changed. However, in the user's local machine, the client shall still be able to write files listed in the build image, or create new files in the directory of the bundle image. Those files and directories should be no difference than local files in the local machine. This is why the local changes should not change the bundled image in the server side; instead, changes are made locally. This variation not only speeds up the local operating, but also allows each user to modify the downloaded files in different way.

In addition, the process of downloading files could occur in the background without user interfering. Most of the time, files are downloaded only when needed. While bandwidth and processing power permitting, the system can still prefetches some of the most commonly used files or even the whole bundle before the files are actually being used in order to speed up the user's response time in the future.

In one embodiment, the system may contain a client side component. Through it the system can record which files have been accessed, read or written and the time and frequency of such usage. Later, when the system is idle, it can send such statistical information back to the server side of the system. Once the server receives responses from thousands or millions of users using the same bundle image, it can aggregate all the statistical information such as which user using what files and can further infer an overview picture of what files are most likely to be accessed in the future and can preload the needed part in advance. In other words, by aggregating the usage information from multiple users, the server can improve the user experience.

In some operating systems, use of the networked file system requires administrative privilege, kernel mode or special security settings. If the OS does not provide such privilege or the user is reluctant to grant the necessary permissions, there is another method to simulate the virtual file system, virtual registry, or other virtual system purely in user mode by hooking up API calls of the application.

In this configuration, when an application is launched, the system hooks OS API calls from the application process through a wrapping layer. This can be done by either starting the process in debug mode, or injecting shared libraries into the application process, or modifying the application executable image to link to a hook library directly. Inside the wrap layer, any calls related to the operating systems such as file, registry and other system components are filtered and examined based on the defined mappings for virtual files and virtual registry.

For example, accessed file located inside a virtual folder of the bundle image shall be redirected to the real file in the local cache; directory listings including a virtual folder shall merge files from the machine's original files with new files in the local cache. As soon as the application process opens, reads or writes a file in the virtual folder, or maps registry items, the wrap layer then redirects the operations to the true native file or registry path in the local cache.

In some cases, the running application or the system may query for the file information but not the file content, such as its size, creation date, last modified time and other meta data. Since file information is associated with the real file, unless the file is downloaded, it is hard to get this information. But downloading the files may defeat the purpose of delayed downloading, if the system or the application simply wants to scan the files info without accessing the real file content. One approach to use is a centralized repository which provides such information, but when the number of files grows, it becomes hard to manage it.

Here we disclose a better approach to use a stub file in place of the original file. For example, each remote file stub is named after remote file with .remote file extension, that is: file xyz will have a remote file extension with xyz.remote which contains file information such as:

size: 1000232332
author: xyz
created: Aug. 18, 2011

Now, the stub files can be downloaded and saved in the corresponding directory in the local machine. From inside the application's isolated environment, the wrapping layer can still utilize existing operating systems' file system access API to lookup and access the stub file for operations such as file and directory listing. The only change is to cut the ending ".remote" suffix before returning the API call result back to the caller. The original caller will see the file name as xyz instead of xyz.remote. When the caller needs to get the information about the file, for example, the file zize, the wrapper layer simply open the stub file, parsing the information stored there and return the result. The deletion of the stub file has the same effect as removing the original file. Only when a caller really needs to access the true content of the file, for example read from the file xyz then the wrapper will actually transfer the real file xyz from remote server and replace the stub file xyz.remote.

In this way, from an outsider's point of view, the file xyz seems always exists, but in reality, only a very small stub file is needed for normal operation. The actual downloading of the file can be postponed or delayed as far as possible without sacrificing the usability of the application. And since the stub file is actually stored in the local file system, which can be renamed, moved, copied or even deleted without any bad effect, the task of managing files and scaling issues can be handled directly inside the local file system.

This same means can also allow creation of an overlap networked file system over existing file system without the need to access the remote server for regular file info access.

Most operating systems do not allow application software to access underlying hardware directly. Unless the application contains a kernel component, use of API hook essentially builds up a virtual system access layer. There are both advantage and shortcoming for this approach. The advantage is that no kernel mode is required and it allows very efficient dynamic behavior and customization for each application. One possible shortcoming is that only wrapped process is able to see the virtualized system in the bundled image, and applications outside the wrapper, or other parts of the operating system are not affected. This shortcoming can be amended by applying a system level hook or wrapper. Sometimes, wrapping only the running application can be beneficial if the user wants to do isolate the running application from other parts of the local machine.

In addition to allow applications running without the need to download all parts before run, the system further allows applications to run inside a constraint environment in order to prevent malicious application to harm the local machine.

Figure 7:
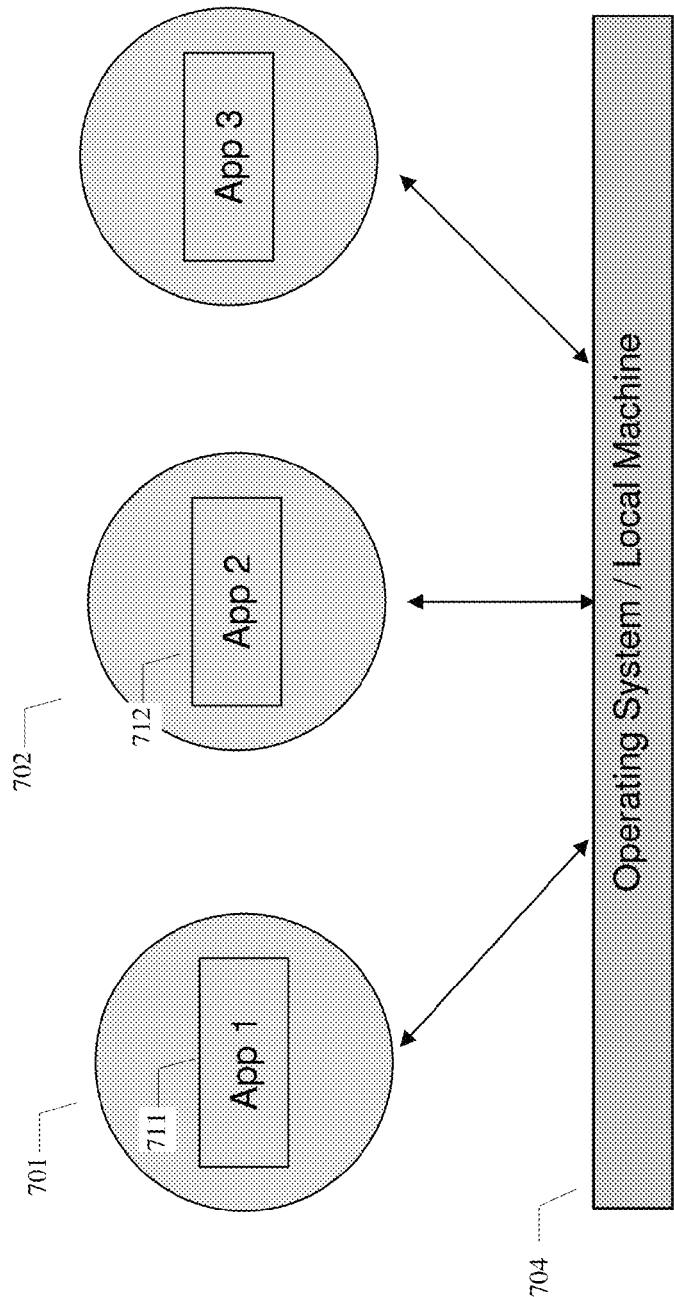
FIG. 7 is a graphical representation showing the overview of executing downloaded applications, each in an isolated environment.

FIG. 7 is a graphical representation showing the overview of executing downloaded applications, each in an isolated environment.

In this embodiment, downloaded application, program or software 711 is executed in an isolated environment 701 to prevent malicious instructions, if any, to pollute the whole local machine 704. Typical applications include virus, spyware, adware, malware and some other annoying applications who try hard to hook to auto-start after system boot or become very difficult to uninstall.

Figure 8:
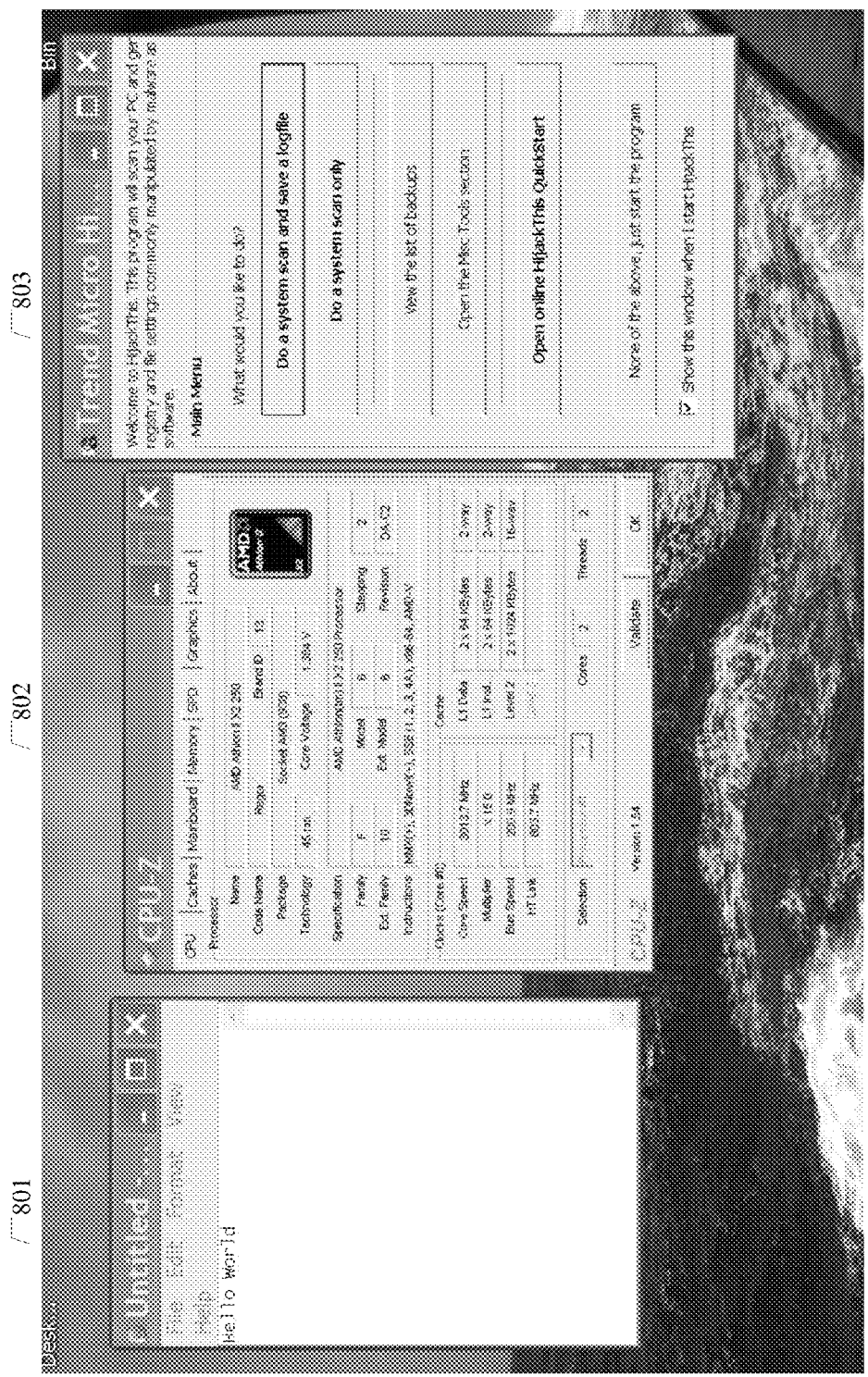
FIG. 8 shows the actual running instances of program or software, each running in an isolated environment.

FIG. 8 shows the actual running instances of program or software, each running in an isolated environment. In this figure, applications 801, 802 and 803 having a red frame which represents the isolation.

In this embodiment, there are several means to launch, execute or run the remote applications in an isolated environment.

One means is to start the application in a virtual machine (VM), For instance, we can use the same VM where the original application installer is installed to, as taught above when preparing the package. The application can be run inside the virtual machine, any changes done by the application is within the VM system, not the local host machine. User changed files, such as newly created word document or edited pictures are also inside VM not the host machine. The user can use some sort of communication mechanisms between VM and host machine to transfer files back and forth.

Another means is to start the application with a virtual system driver providing a virtual file system, virtual registry or other virtual system components to isolate the application process. Those components typically run in kernel space to provide support to the operating system and other user mode applications. Within this system, the virtual file system can be setup to redirect files written to the file system to the local cache of the application bundle, registry changes to a virtual registry file or space, other system changes to corresponding local cached versions, hence the client machine's local file system, local registry and other system parts are successfully protected.

The application now runs in an isolated environment so it cannot affect the main local system, but it should still be able to access necessary files outside the isolated environment when needed. In this case, read operation will search the application bundle's local caches first, then the client's main system, so that application and the user can see a unified system and data including his own changes as if it is using as a traditionally installed application. This approach is also lightweight because the application itself does not need any changes.

Sometimes, use of virtual system drivers is a system level operation and requires administrative privilege. If the user does not have permissions, a third means is to run the application process through a wrapped layer by hooking up system API calls from the user mode. By intercepting calls to the operating system on file system, registry and other system states, then modifying those calls before and after, the wrapped layer can isolate the application bundle in a virtual safe box because any changes can be made to local caches and read operations are also merged from the local caches as well.

Figure 9:
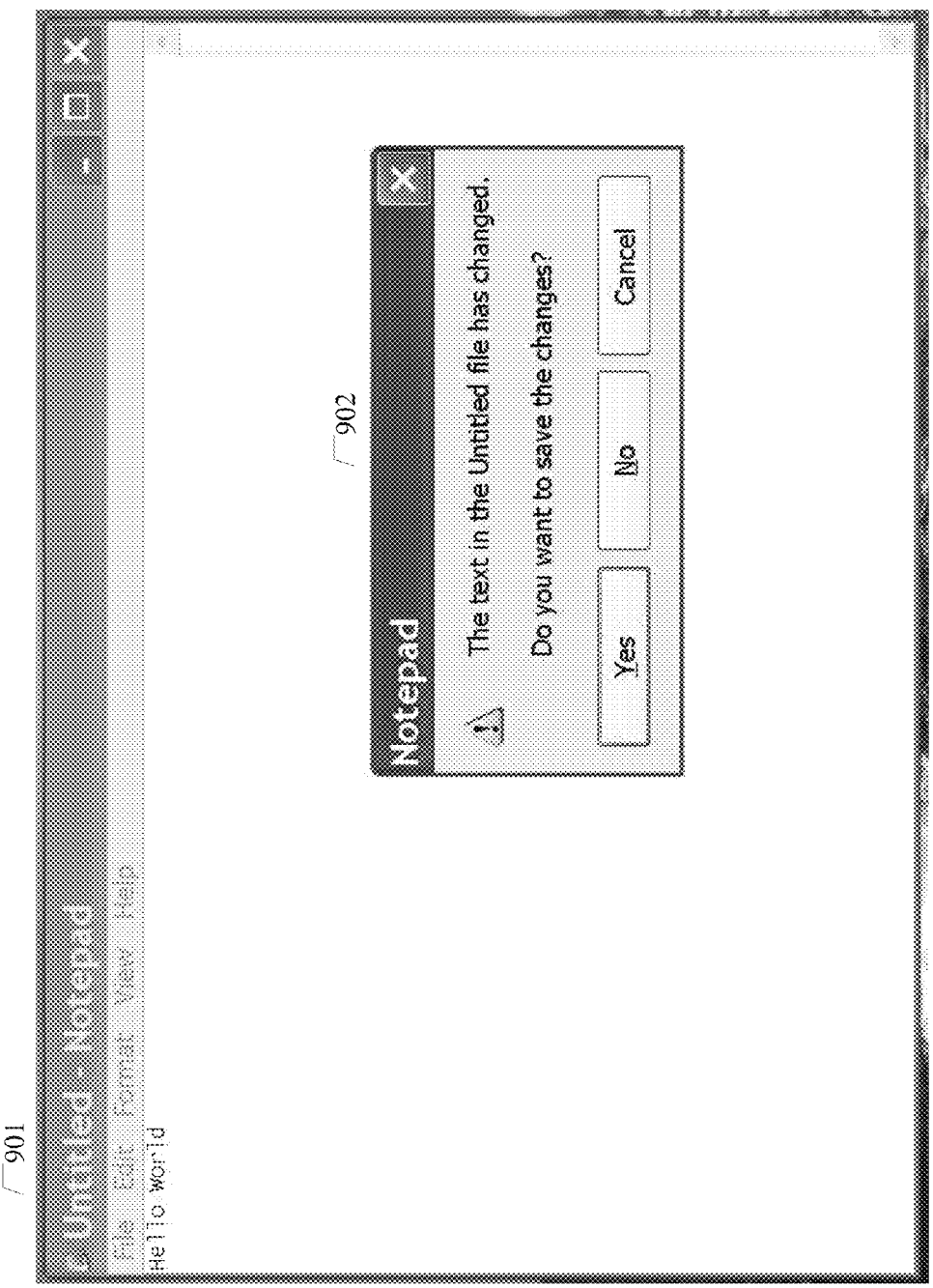
FIG. 9 shows an application with child window being wrapped with red window frames.

In practice, in order to make the user be aware that the application is running in an isolated environment, our system can make some changes to the main application window, such as wrapping it with a red frame, as shown in FIG. 8. This can happen even when the application is opening multiple windows, such as child window or child process, as they can also inherit the same isolated environment. FIG. 9 just shows an application with child window being wrapped with red window frames.

Those disclosed isolation techniques are similar to the above disclosed methods for creating bundles. In fact, same techniques can be used almost identically for both package creation and application launch with only minor differences about different the rules for reading and writing system components. Actually this is also an advantage for this system because it can greatly reduce the cost for implementation.

Yet another means to safeguard an application is to fully utilize operating system's own capabilities, for instance, letting the application run under a different user. Some operating systems do have such capabilities but in the majority cases, those operations are too technical savvy and users seldom know how to use it. Our system can help to eliminate the burden, or cost for such operations and make them fully smooth and automatic. For example, the system can temporarily create a hidden, less privileged user that does not have much access rights to the whole system or normal users' data and execute the program under this user's token, thus avoiding the risks for the application to modify any user or system files. Only when the user wants to share his files to others, the user permissions can be released.

After finished running an application, if the user does not want to use the package any more, it can be removed easily—no more manual uninstall process is needed because the system can handle it automatically without user intervene unless the user selects to do so. Typically, the system manages the local cache and can cleanup it up periodically or in case of disk storage shortage, at the time, typically the least used packages in the cache can be removed.

With the above mentioned system and methods, a user is able to run any arbitrary applications seamlessly from a remote bundle, securely and natively. In another embodiment, the system provides an application web portal for any user to run any application by a single click from within the browser. In addition, it also provides an easy way for any developer to upload his own applications and sharable to other users.

Figure 10:
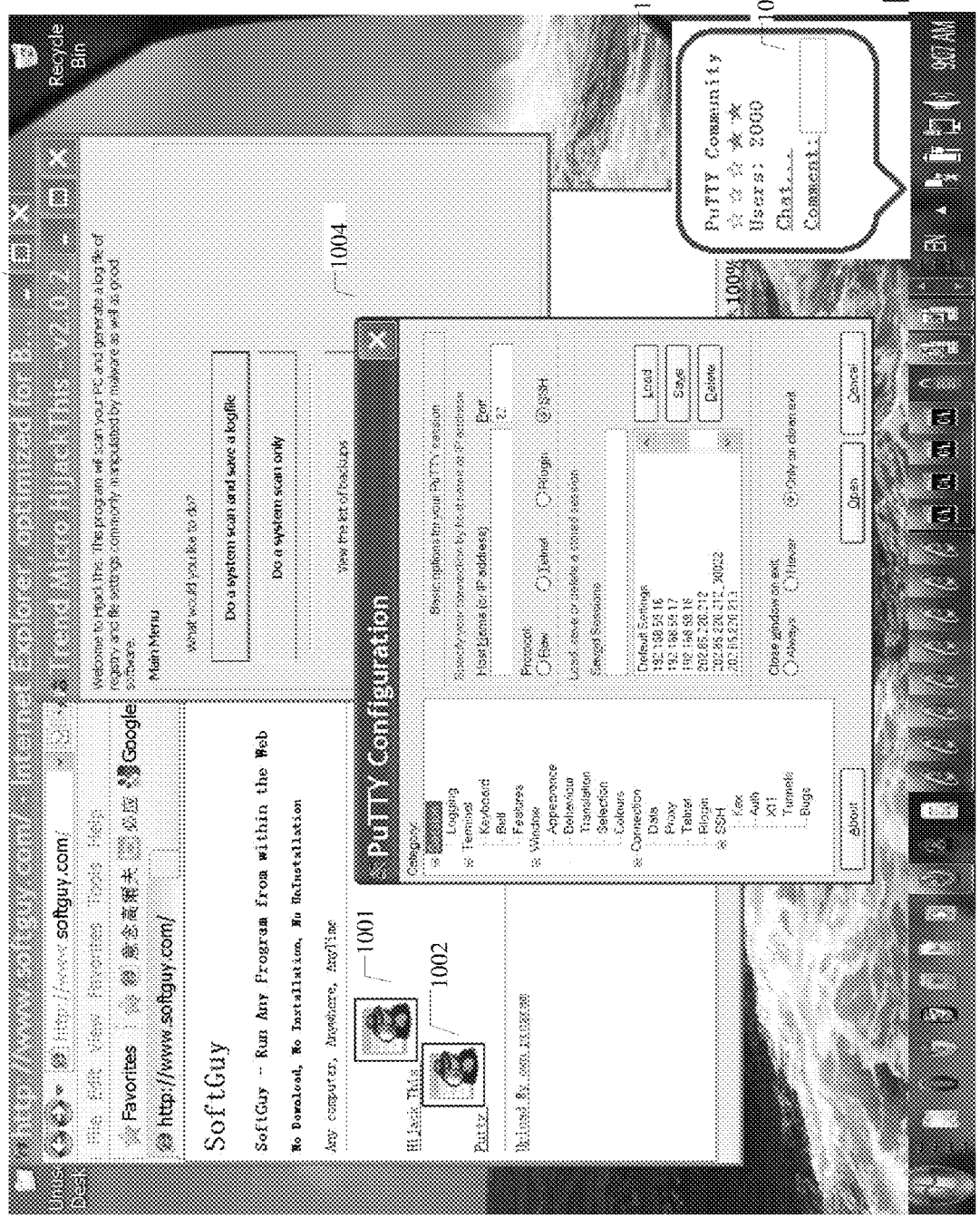
FIG. 10 shows a demo application web portal with 2 applications opened from the browser.

FIG. 10 shows a demo application web portal with 2 applications opened from the browser.

Traditionally, when a user wants to use software, he has to buy the software from the developer first. With shareware, or trial-ware, he may also download the software to try it before actually pay a fee to get a license key to unlock the software. Although the application portal can also implement the traditional payment mechanism, it also offers extra payment opportunities—micropayment and pay-as-you-use for software developers and users easily using this system. Pay-as-you-use is a more fair approach as it is similar to software rental and is a key to true software-as-a-service. Traditional software vendor is really difficult to implement those methods because it is very difficult to track the real and actual usage in a generic manner, but this system can easily track almost every application's real use time measured as small as minutes or seconds.

Currently many modern software packages are huge and expensive. For example, Microsoft office suite has several gigabytes and charges several hundreds of dollars. As time goes on, more and more features are integrated into the software package and the software can be priced higher.

However, an average user might seldom need to use all of the features developer has designed but still has to pay for the full license fees in order to use. Piracy also becomes widespread due to the high license or usage fee. But there lacks a standard way to effectively measure the actual usage of software, access of the features, and how to charge software based on usage and features because each and every application need to integrate and build with a special module to do so, which is time costly and time-consuming.

On the contrary, since our system already allows users to run any software package from a central application or web portal, it can be further configured to track any and every user's usage of software package. This can be done by assigning every user a unique id and user account. When the user runs anyone of the downloadable software package, the system records the time the user starts to run the application and how long it has run. Later on, it can send the measured data back to the server to charge the user's account. In this way, any software developer can price their software package by minutes when they list and upload their software to the server. The server then can charge the users account based on their true usage, not a one-time fee.

Under this scenario, a user who wants to use an office suite for a couple of minutes to write a resume may not need to pay hundreds of dollars for the whole package—instead—may only be a few dollars for a few hours. In this way, even the developer may not be able to receive full price from that kind of users, it attracts far more users due to its low price and more flexibility. In addition, developers now can get access to a much wider user communities because now almost everyone can access and try their software much easily. With this approach, high obstacles for trying new software—high license fee, difficulty to download and install software, are now no longer exist. This opens an alternative way for commercial software to compete with freeware or open source software.

In the above mentioned scenario and features, all the modules can be dynamically insert into the newly running applications. There is no need to rebuild, or recompile the original application, and thus the source code of the original application is not needed. The system can dynamically insert different modules into the encapsulation layer based on the user, developer or system's configuration. For example, if the user needs to test a software under a different year or time than the current time, a time machine module can be used to simulate a different time only for that particular application. That application may think it is running under different time but the whole system is not affected.

Other type of micropayment can be further integrated in to the system. For example, fees can be charged based on the documents created or pictures edited, or drawings painted, or even features used, like one dime per document saved, one cent per spelling check used. The system also may provide free minutes or usage count to users as promotions to attract more users in the beginning. Of course, multiple payment options can also be mixed. For instance, the user may pay all-inclusive license fee to avoid future usage charges if the developer allows such options. It is our system who implements and enforces those charging policies and developer does not need to modify their software or program at all. The whole point is that this system allows or enables maximum flexibility of payment methods for any existing and future programs.

All this is achieved by the system to monitor further details of software running process, such as which part of the software is being loaded/used, which files have being created/modified, which dynamically loaded libraries being loaded/executed. Since the system is responsible for launching and running the application from begin to end, the system has the power to further fine-tune the fee charge based on operation details For example, the system can starts a word processor, and then monitors the spell check module and charges 1 cent for each spell check function. Users who never use spell checks will not be charged for that fee and developers can earn more from users who used a lot of those additional features and are encouraged to develop more advanced features in the future.

To implement the monitoring and internal charging functionality, a client side component in the user's local machine is used. That component can be automatically inserted during package creation or dynamically inserted during application launch time. Once the application is started, the component is also running and start monitoring the charged items as time goes on, and report back to server as needed. If the application is always launched from the web portal, the monitoring module can be dynamically injected into the application process. Otherwise, if the application can also be launched from the user's local machine, such as desktop icon, start menu, then the system needs to ensure that the monitoring and charging modules are also loaded when the program is running. This can be done either by running a monitor process in the background, or statically linked the main executable of the application to auto start such module during launch.

Different desktop technologies need to be integrated together which is not easy. For example, to allow launching programs from browsers, web plugins, such as ActiveX, Flash or other browser helper object, are used. To dynamically insert modules into the process during application launching, either kernel driver or API hooking can be used. In order to allow offline charging when the user is not online, a module shall keep track of the statistical information on the local cache and then re-sync or upload them to users' online account when the users' local machine is back online again. Nevertheless, the system can be configured to be more flexible by different types of components based on different requirements from developers and users. One thing worth of mention is that all the additional components, such as monitoring, injecting, or charging modules can be automatically delivered to the user through the same mechanism of application launching so that there is no extra effort or incontinence for both developers and users.

That said, as soon as a user browses the central application web portal and selects a software package to run, the system automatically choose the appropriate components based on the application's license and payment type. The system can also cache them and delivery them automatically on first run. No user interactive will be needed during this process.

As said the system can be configured to also allow offline mode usage when the user's Internet connection is gone. For example, a user can continue using last used packages in offline, as long as all the needed application package and files are already in the local cache. If the user wants to use certain applications in both online and offline mode, the system may choose to download all necessary files first. The system may further cache contents of web portal so that the user can continue accessing used applications during offline mode. In additional the system, through its client components can still monitor and record usage and other tracking info in the offline mode. The only extra thing is to re-sync the data as soon as the user or the user' local machine is back online.

The system can be further configured to work smoothly when the software package has multiple versions by automatically maintaining different versions of the software package. Traditionally, once a version of an application has been installed, a new version cannot be installed without first uninstalling the old version. That's why many people stick on a favorite version for long time, not mentioning that new version may cost extra money and headache for downloading, uninstalling old version and then installing the new version every time it is released. Sometimes, if a new version is not compatible with the client's local machine, the user has to uninstall the new version and reinstall the previous one. Even with some auto-update software packages, the auto-update process may not work as expected, not mentioning the additional CPU network and disk resource consumed.

In this system, all the hassles related to the software versioning are gone. For example, the system can be configured to always deliver the most recent application package to the client's local machine based on the clients' operating system version to make sure they are compatible. This is done automatically without user involvement. In addition, when the user chooses the software with multiple versions, the system can list all existing versions and allow the user to choose any version to start. In case a user wants to use a particular version, the system can dynamically download the necessary files for that particular version and execute it. Furthermore, the system may even allow multiple versions of same application coexist or simultaneously run together as long as each version is isolated in its own safe box or environment.

In yet another embodiment of this system and method, the system can be configured to aggregate user generated information for any applications launched. Because the system can distribute and run all the packages to worldwide users, it can also be easily configured to retrieve explicit and implicit user generated information such as use frequency, use pattern, feedbacks, comments, ratings, most commonly used features from all users in a generic way. Implicit data include data implied by the user actions or operations during the use of application. For example, based on how long a user uses a particular software, a "stickiness" or rankings of the software can be detected implicitly. Furthermore, if a user constantly put an application to the background, most likely it is not the most used software.

Of course, to protect user privacy, certain data collection shall let users know beforehand in order to be compliant by laws. The statistical data or information collected by the system can be further analyzed, used for targeted advertisement or sent back to the developers to further the product. For instance, within the system, one can easily find out what software is most popular, which feature of a particular software is most widely used, which file is downloaded most.

More fine-tuned information can be collected such as which menu is mostly clicked or which command is mostly executed for any application. Almost all of the normal user operations and actions can now be measured and quantified and be sorted numerically or graphically. The data can no only be used by the system and developers, but also by users of the application, for example, to provide useful input to a recommendation or advertisement engine.

Runtime information about the application, for example, software crashing bugs can also be detected by the system and notified to the developer through a monitoring component that intercept all unexpected software issues of the application.

To provide users more feedback regarding the applications and help them evaluate, assess and select appropriate software package, this system can also provide all users' comments, rankings, votes, chat rooms or other means in a central place right before the user start to launch the application, or even while the application is running. Compared with traditional software download or listing sites, this method is straight forward and more effective. In conventional software download site, if user wants to write comment for a software, he has to go back to the original web site, re-select the software he used before he can enter his comment.

But the segregation between the listing site and actual running application make it less effective as few people will have incentive to go back to the original web site to leave comments once he already finished downloading. On the contrary, in the present system, the application portal is also the application launching entrance and can provide components to allow users to share his opinions while he is using the application. This is a much more effective than traditional approach.

Another kind of feedback provided from users is virus warning. Since this system allows developers to upload their software freely, some people may intentionally or unintentionally upload some kind of malicious code. Although the uploaded software can be scanned by anti-virus software, there might still be some new or hidden virus unrecognized by the existing anti-virus system. In this case, if any user discovers a virus in the application, he or she can immediately provide this feedback to the system so that other users can see it and stop using the application, or the system could remove the package from the system repository to stop spreading of malicious code. Of course, isolation of applications can also add an additional protection layer to the user's local machine.

Each of the above mentioned features can be selectively applied by the system as needed and can be combined together if necessary. Typically, they can be implemented using client side component, or plugins that can be dynamically inserted into the executing process's address space. It can also be implemented as part of a wrapper layer or encapsulating environment in which the application is running. Sometimes, the server can perform the tasks as well. Configuration of the features can be applied based on the design of the system, the requirement of the developer, or the preference of the user.

In traditional software download sites, feedbacks from users are not in real time. Users first search the software in the site, then download the software installation package. After downloading, the software site is no longer needed and normally be closed after downloading. Only after successfully executing the installer to install a package, the application can than be used. But at that time, the original site is typically no longer exists, and very few users has the incentive to re-open the original site to submit their feedbacks or other information.

This shortcoming can be remedied in the present system when the system generate and maintain a real time community for users using the same software and application. In this embodiment, as soon as a user finds the application in the web portal, the user is presented a community regarding the application along with an entry to run the software with a simple click. Even after the user clicks to run the software, a client side component can still connect the user to the same community to allow the user to get an additional information about the software, or provide feedback about his/her usage at any time during the lifecycle of the application.

For example, the system can not only display the most frequently used applications and worst used applications, but also show in real time how many users are using the software when the application is running. The system can prompt a comment window after software is terminated; add a feedback menu to the main menu options of the application. In addition, the system can also open up a new window to ask users to vote or recommend within the software. Interactions between users and software thus are real time, and can help developers to know the needs from the user much more easily.

Interactions can not only arise between users and applications, but also among users. As the system offers all the applications and provides ways to launching from a central web portal, it is easy for the system to track the application usage and build up a community consisting of all users using the same software. Many user interactions can happen, such as demo, tutorial, sharing of knowledge and know-how.

For example, while one user is using a word processor application and encounters a problem, he can open up a popup window through the system to chat in real time with other users, asking for questions and helps. This may be a more straightforward and effective way than looking up the manuals. In addition, the system can connect to different community based on the applications. For example, in FIG. 10, when the front application switches to application 1004 (Putty), the system can show the content of community 1006 for application 1004, which contains user numbers, rankings, and other feedbacks 1011.

Worth of mention is that all the additional community functionality can be added to the application by the system without the help of the original software. The original application can be any standalone application, and the system does not need the source code of the original application in order to provide those features.

Furthermore, all the users and developers in this system can form unique social network where everybody can not only share their thoughts about software and applications, but also share other information about themselves and start to build relations within the system. The system may also allow users connect to other popular social networks.

For instance, the system can list a user's most recently used software package in his or her personal web page within the community and then share it to family members or other friends. Other users can simply go to this person's page to see a list of applications used by the user and may use the same applications directly from that page. This is useful when there are too many software with similar functionality and user having difficulty to choose. It can simply follow an expert in the field and use whatever application the expert is using. Of course, the expert must be willing to share his choices to help others. In this way, behavior sharing becomes so natural that the user does not need to do any thing—the system can do it automatically and all users in the system can benefit from such sharing.

In addition, as the system can detect who else is using the same software with a current user, it can discover the behavior and interests similarities with no additional cost. For example, it can simply accumulate and aggregate the usage statistics for uses and do internal search and match to find out users with similar behaviors. Furthermore, other than applications executed, the system can also find other behaviors among users, such as music listened, videos watched, web sites browsed, documents used by tracking internal behaviors for running applications, With the capabilities of detecting user behaviors based on the applications he is using and internals of applications, the system can also easily group or classify users with the same interests, similarities or topics and form different groups, subgroups or circles based on different interests. Passions can also be detected based on the different indications collected, either explicitly from votes or implicitly from actual usages, and can also be collectively used in the system and community building, for instance, creating a communities composing Internet Explorer browser lovers and another community with all Internet Explorer haters. Various other social interactions can also be erected on top of the system, such as social games and recommendations.

In summary, in a social network like this, the system can not only aggregate applications but also aggregate users, developers and distributors. Equipped with applications, user data, usage statistics and user behaviors, much more hidden data around applications and users can be mined out easily and without extra cost.

To further improve download speed and application launch process, the system can be configured to use peer to peer (p2p) technology to reduce network bandwidth usage. For example, once a particular user has run an application, peer computers in the same local area network (LAN) of the user can immediately benefit by retrieving all necessary files for the same application directly from his computer without re-downloading same files from the remote server. This normally yields faster performance improvement because LAN access speed is typically much faster than a WAN connection.

Share of application bundles using peer to peer (p2p) can be used for either family or corporate networks where multiple computers are connected locally in a local area network (LAN) before connecting to the Internet. People in the same local area network, like workgroups, may also have closer interests and may use and share more common software and applications. In additional, p2p sharing is beneficial to the user as well as the whole system because the server can also reduce bandwidth usage. The only thing the system needs to do is to automatically setup a p2p component for each user during the first time.

Even if a user is not connected to a local area network, p2p can still be used in that every user can behave as a p2p node and allow other users in the "nearby" such as computers from the same subnet, or within the same geographical area, can connect to them to retrieve files already downloaded, thus further speedup the application launching and running.

In p2p mode, client side components in the user's local computer can be configured to communicate with the server about status of its downloaded applications for files as well as Internet information such as its address, subnet, gateway or routing info so that the server can instruct other peers to connect to them correctly. In order to handle firewall issues, various firewall tunneling protocols such as STUN and TURN can also be integrated. Basically, all public files for all applications received from the server and stored in the local cache can be downloaded to peers.

With p2p mode enabled, when a node is requesting for particular application file, it may first search from its peer nodes, like other computers in the same LAN or other computers in the nearby networks before reverting to the remote server as a final resort. Moreover, if multiple peers contain same files, a node may simultaneously transfer different parts of the contents, or different files from multiple peers, which further increases the download speed. Of course, the p2p mode may be optionally turned off for some users or some applications if there is any security or license concerns.

Additionally, to further reduce the server load and to increase file download speed, the system can be configured to utilize existing public file sharing networks or existing p2p file sharing networks such as ed2k protocol or Bit Torrent networks to transfer files or applications in public domain. For example, some big files, like Linux kernel, or open source files, could be stored in bit torrent or ed2k networks and the client is then be configured to check the availability of those files through those p2p networks during file download.

In summary, under this system, any user can use any software, especially native applications directly online from a web browser. Running an application becomes as easy as opening up a browser and clicking a link in a web page. No more hassle for manual download, installation and launch and no more complicated software managing issues for average users. In addition, by allowing software to run in an isolated environment, a users' local machine can be protected. All software can be kept always up-to-date version without the need for manual update since the server already takes care of it.

Some operating system dependent features can be also added from the server side. For instance, Windows Vista™ and Windows 7™ has a UAC (user account control) which allows one application to run under different privilege within the same user. Running under wrong privilege mode may be cumbersome (like pressing Ctrl-Shift-Enter keys or selecting from Run as Administrator from a right menu in the explorer) and many people, including many professionals, do not know the trick. However, our system can easily overcome this issue by associating the most used privilege mode to an application and automatically choose the right mode during the launch, (for example, always using privileged mode when starting a malware scanner) thus can totally avoid headache for remembering when to use different mode for different applications.

The user also has the option to setup and maintain an online desktop containing links or icons to all the common applications he used. Then the online desktop can also be shared with other users. The online desktop can be kept in the server and allow user to login to his own desktop. The desktop will contain links to start the remote applications from the system. For certain commonly installed applications in the local operating system, including system applications or components, such as notepad, paint and media players, the desktop can contain a specially formatted hyperlink to launch the local application. Otherwise, the system will launch the application using the methods described above.

In this way, even a user switches to a new machine which does not yet have any application installed, as long as he logins to his own account in the server, he can immediately access the same desktop online and click any application to run. The system will take care of re-caching the newly selected application from remote server to the new local machine which might require a little bit more time on the first launch. But the user has gained the freedom to use any machine he wants to use at any time.

In addition, if the user has created new files or made any modifications while using any application, such as changing program settings, creating new or editing existing files, those files typically are saved to the local file systems of the local machine so that when the next time the user uses the same machine, those files or changes are still available even when the machine is offline. Offline mode can be supported when the system is configured to use a cached desktop through client side component that integrating with local browsers to allow users to continue using the already downloaded applications while the local machine is offline.

On the other hand, the system can also be configured to sync the locally modified files and settings by the user to the remote server. This can be done either synchronously, when the syncing happens right after the modification occurs, or asynchronously when the modifications is first saved to local files or settings and then synced to the server at a later time. In either case, each user may be setup to have a personal storage in the cloud or remote network which may be available on multiple local machines and even sharable with other users.

As an example, if a user logs from a second machine after making changes from a first machine, the system first syncs those new modified data (files, settings and other changes) from first used local machine and then re-syncs those newly updated data back to the second machine immediately. Optionally, the system can allow the second machine to retrieve the actual changed data directly from the first machine. The re-syncing part can also happen as soon as the user login from a second machine, or, delayed until after the user starts to use an application and the application wants to use (open, read or write) those data. No matter which method, from user's point of view, newly modified data are always available anytime and anywhere, regardless of which computer he is using. Advantage of this solution compared with a tradition network disk is that the changed data, like files and data automatically available from the same application across multiple computers. Furthermore, those data are also offline accessible since they are cached and synced to each of the local machine beforehand, thus avoiding the huge latency associated with pure network file systems during actual use.

Another benefit for this approach is that a user can further freely manage and organize his own files and settings from within a web interface, like setting up accessing rules and permissions. For instance, a user can mark changes he made while using a particular working application to be publicly sharable among the group of his coworkers. As another example, he can also setup rules to keep any changes in his own personal computer privately and prevent them from being sharable to other people. The system can record user's choice and guide his privacy settings system wide.

In yet another embodiment for the system, at any time a user can erase or clean local cache or data with a simple click. The system can be configured to optionally lock, unlock or remove the access to the files, settings or other data located in the remote server as well as local cache. For example, when a user leaves a company, with traditional software management approach, he may has to manually uninstall all software he installed or manually delete all private contents before the machine can be used by another person. Under this new system, however, the system can simply be a turnkey to automatically lock, unlock or delete all local files and cache in the local machine, while still keeping a copy in the remote server or in the cloud. The local machine instantly becomes fully clean without any IT involvement and the next user simply needs to login in a different account in order to use all the application and software in the server.

There are cases where one application depends on another packages—runtime libraries, shared components or other files; sometimes a group of applications need to run together. For example, a word processor may depend on spelling check software. For those applications, the system can be configured to remember such dependency between application packages. Later during application download stage, it can walk through the dependencies tree and fetch all dependent application packages first.

For instance, if A depends on B, the B is fetched before A. During launch time, the system can launch both applications together to resolve the run time dependencies. If there is also need to run a group of applications in an encapsulated environment, the system can put those multiple application packages within the same isolation layer. In this way, the system recognizes and treats multiple packages the same as one package—i.e., files, registries and other data then shall be shared and visible to each of the applications in the group.

The system and methods disclosed here not only work for desktop, but also work for mobile operating systems, such as IPhone™, Android™, Windows Mobile™, Blackberry™, Palm™, Symbian™ and the like. Actually the methods and system disclosed work seamlessly with the design of the mobile operating system because many existing mobile applications have to be manually downloaded and installed to local before use. However, lack of enough memory space of mobile OS, huge amount of mobile applications and slow, jetty mobile networks make locally cached applications a better alternative solution which allows much faster and better user experience.

If an application uploaded by a developer or distributor is designed or created for another operating system other than the native operating system for the local machine, the system can be further configured to run the target application through a layer of emulator, simulator, virtual machine or converter. An emulator or simulator or virtual machine can allow an alien application to run in local operating system and a converter can convert an application from one operating system to another and then run natively. In other words, the only added steps is for the system to first downloading and running the necessary emulator, or running the converter to convert the application first during the application launching phrase. In this way, a user can use any application targeted for different operating systems.

For example, when a user uploaded an android application, a user using a windows machine cannot run the android application because it is not targeted for Microsoft Window operating system. But the system can still a user to run such to run the android application with a simple click by recognize the target application—android operating system for the application and then launches an android emulator application first. Then the system can be configured to download the android application and put the application inside the android emulator before starting the android application within the android emulator. Here, the process of running an emulator or simulator is exactly the same as running any other native applications as disclosed above.

Another useful example is java application. When packages require java runtime or java virtual machine, the system will first check the locally available java runtime version and fetch the necessary java packages if not found. Later the system can automatically starts the Java application from within the local Java runtime.

Each application may have multiple configurations provided by developers, users or system administrators. For example, a java application may be run with multiple versions of Java developer kit (JDK), or with different command arguments. When the user selects the application to launch, he may also have the option to select the appropriate runtime settings. If the user has no preference, the one that is most compatible with local machine, or the default may be automatically used by the system.

The system may further be configured to allow users to simple automate the installing of an application to the local machine and launch from there. For example, a user may prefer to install some commonly used software packages like the email client or the Office suite locally. In this case, the system can simply download and install all software installation packages as if it were downloaded manually by the user.

Later, when the user wants to launch the application, a special hyperlink or shortcut, such as a different protocol or format, can be recognized by the system to launch the local applications directly. Depending on the user preferences, additional modules, such as monitoring, isolation can be opted in or out. Additionally, if the user wants the ability to start and run an application in the server from regular desktop icon, start up menu or shortcut icon, the system shall create a special link to launch the application through the system. Such link shall be saved to the local desktop folder and startup menu instead of the local cache in order to be used outside the system.

To further allow better integrate for executing any software within a browser the system can further provide a hook that check and modify all the hyper links of any web page a user is browsing in the browser. For example, when the browser opens a new web page which contains a hyperlink to a traditional software installer package, in the past, the browser will prompt the user to download and save the software. After downloading, it is the user who has to install the software before use. Now, with this hook enabled, the hyperlink to the installer can be replaced by a "Run it now" button which contains a link to directly launch the application through our system. As shown in FIG. 11, original web page 1100 has two applications with download link 1101 and 1102, after hooking the browser, the page is shown as 1110 and the two download links are changed to 1111 and 1112 respectively. When a user clicks one such link, the server, or the web application portal is then queried for the application. If found, instead of downloading the installer, or the setup file from the original link for the user, browser can automatically starts to launch the application directly. This approach provides a much better seamless user experience since it allows the user to use any native application the same way he is browsing a hyperlinked web page in the Internet.

On the other hand, when an application is not found on the server side, the browser can prompt the user to manually upload the application first, if the application is in public domain. Uploading the application also involves downloading the installer, creating a software bundle image from the software installer and upload to our central software resository to make it available to public next time. The browser can also automate these tasks by downloading the software, creating the bundle and then uploading the created image to the software portal, all automatically. If, however, the download link is to a private content, the hook may bypass it and revert it back to the original download link of the installer and let the user to handle the download and installer himself.

In reality, with this approach, any software download site can also be instantly equipped with the capability to launch or run all of its software with a single click in the web page. This system and method greatly speed up software distribution process and make using software as similar or as easy as browsing a web page.

Multiple existing browser hooking techniques can be used such as browser helper objects of Internet Explorer™, plug-ins and extensions of Firefox™, Mozilla™ or Chrome™ browsers. What the hook does is to iterate every hyperlink in a displayed web page, and search for a matching hyperlink that seems to be pointing to an application installer, for example, a zip package, a MSI installer or an executable. It then replaces those matched hyperlinks directly from a traditional "download now" link into a "click to run now" link which redirects to our application portal together with the original URL. To a user, starting and running the software is just one click away.

In one embodiment of the present invention, the system can provide additional options for a developer to promote product. One way is to enable developers to give group discount if the total number of users reaches a minimum threshold. Due to the fact that software license can tolerate large amount of discount when large amount of users exists, this could benefit both developers and users. When users get discounted price to use officially licensed application, developers get more revenue as well.

In another embodiment of the present invention, the system also allows small device that is not capable of running native application in the local machine to setup a terminal emulation which can communicate with a remote server process which runs the native application in a virtual machine running at remote server's processing unit. The terminal emulation can pass through input and output signals between local machine and remote server so that users in the local machine can operate remote process as if through the real terminal of the machine. With this added feature, the system can run larger applications that are not capable of running in a small or thin local machine. It further allows watching and operating desktop applications from within a mobile device wherein the desktop applications are running inside a virtual machine of remote server and mobile device behaves as the terminal of the desktop application.

In this configuration, a local machine can be a device which acts as an input output terminal for applications running in the remote server in a remote virtual machine. The local machine could be a laptop, a net-book, a tablet pc or even a smart phone. The remote server can run a program with a different architecture than the local machine, as long as the remote server is capable of running. For example, from an iPad, a user can play a windows game running on the server side. The user can use the touch event of the iPad to control the remote program, and the screen of the remote program is then streaming to the iPad. Of course, this can only happens if the developer and user choose to use this configuration since this may have high bandwidth requirements.

Figure 12:
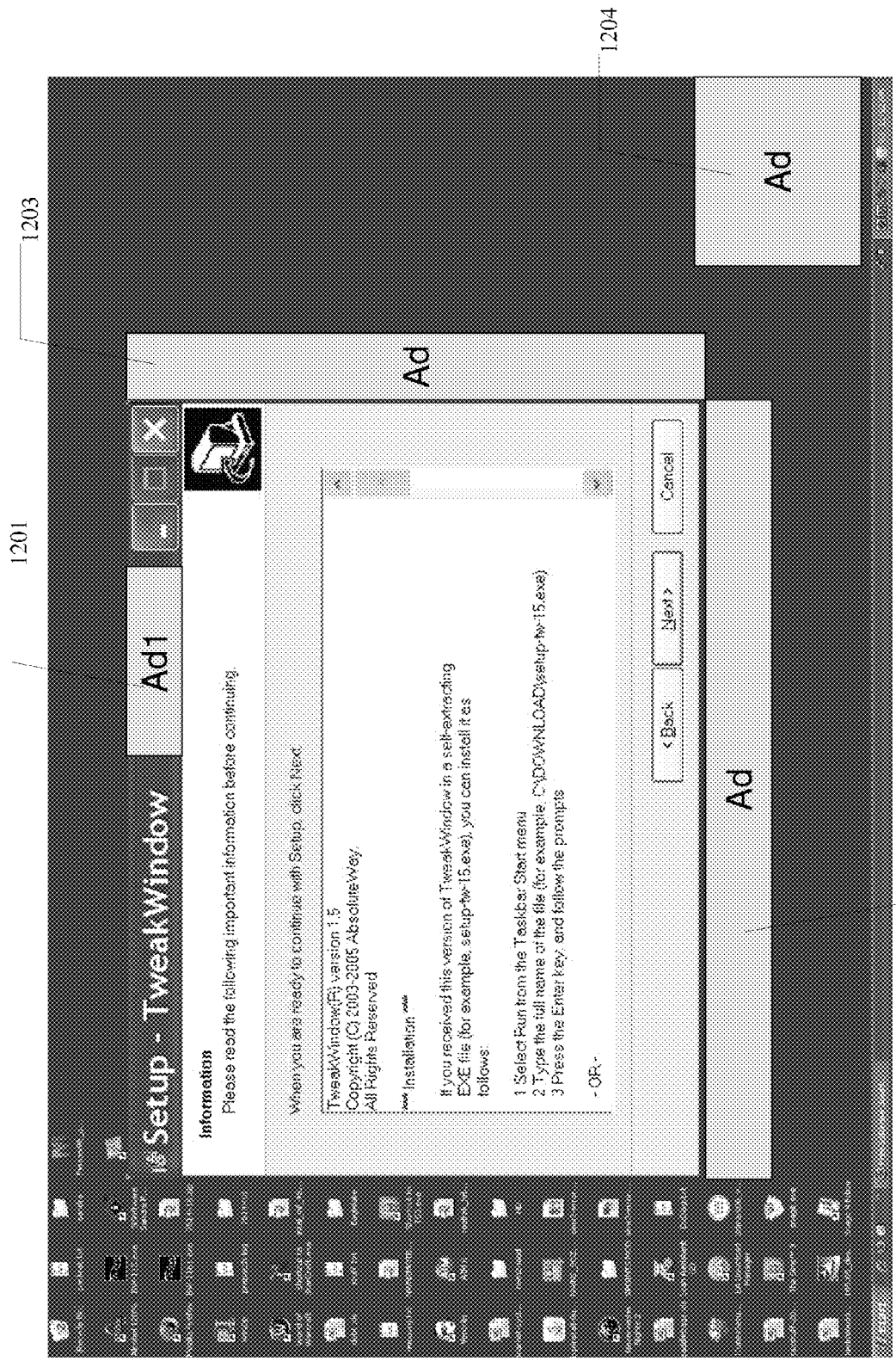
FIG. 12 shows screenshot of ads being displaced along with any running application.

On top of this new software execution platform, there is possible for the system to further compose of a new type of advertisement delivering method where an ad can occur while software is running from the browser. Different from traditionally ads, which are either sideband ads inside a web page, or splash ads before a page, as shown in FIG. 12, in this system, the system can display an ad along with the newly launched application. Since the system can hook the API calls from the application, the ads can be configured to display any where—it can be in the title bar (1201) of the running application, or it can be in the bottom of the application window (1202), or it can be is side by side with the application (1203). And it can also be outside of the application, for example, in the corner of the whole screen (1204). The beauty of this ads delivery and placement is that ads can be targeted for any application and the original application does not need to be recompiled because the ads can be dynamically inserted into the running process while it is being launched.

For example, when the running application is launched and it tries to opens a new top window, then the system can intercept the API calls to open the new window and automatically create an ad window in the title bar of the newly created window, or on the bottom of the newly created window. In addition, to reduce interference to the user, the system can set a time limit for how long the ad to disappear, so for example, an ad can show for 5 seconds and then disappear if the user does not click on it.

In addition, the system can further allow developers and third part to create different types of ads in the system and the system can distribute the ads to different users based on their true interests. For instance, the system may display a software tools if a current user is running a compiler program. If the current user is instead, running a paint program, the system may push the art related ad to him. In general, it can form a new advertisement platform which allows additional options for developers to promote their product through it. Other advertisement techniques, including bidding for ads, can also be applied.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and their equivalents.

What is claimed is:

1. A method of allowing a user to run an existing native application binary code from within a browser without manual installation comprising the steps of:
  creating a native application bundle from an existing native application installer with a stub automatically;
  uploading the native application bundle to a remote server accessible to the user;
  starting a client side component when a user clicks a link in a web browser;
  downloading and caching immediately needed parts from the native application bundle to a local machine;
  launching and running the native application binary code completely from within the local machine without performing any other native application program functions over a client server connection except for the downloading and caching the immediately needed parts from the native application bundle to the local machine;
  and downloading other components and parts of the native application on demand while the native application runs.

2. The method of claim 1, wherein creating a native application bundle further comprising:
  monitoring activities of said native application installer to create a list of files and settings needed for said application to run.

3. The method of claim 2, wherein monitoring the installer activities can include monitoring methods from one or more selected from among:
  hooking system APIs, setting up virtual file system, virtual registry or other system drivers, and using a virtual machine.

4. The method of claim 1, wherein launching and running the native application further comprising:
  continuing downloading and caching needed files and other data by the application when the application needs to access the content of the data.

5. The method of claim 1, wherein the client side component comprising a networked file system to map to the bundle of the native application in the remote server.

6. The method of claim 1, wherein the caching application parts enables sharing files and settings from different application bundles.

7. The method of claim 1, further comprising: running the native application in an isolated environment from the local machine.

8. The method of claim 7, wherein the isolation environment is achieved from a wrapping layer provided by one or more selected from among:
  virtual machine, automated system capabilities, API hooks, virtual file system, virtual registry driver, or other virtual system access layer.

9. The method of claim 1, further comprising:
creating a per user account in the server and allowing data in the local machine to sync to the remote account and sync the data back to a second machine when the user switches to the second machine.

10. The method of claim 1, further comprising:
providing a personal application desktop with links to personal native applications used which can be shared with other users.

11. A system of launching and executing an existing native application from within the browser in a computer system or a mobile device comprising:
a computing server comprising one or more processors and one or more memories, wherein the one or more memories store computer-readable code executable by the one or more processors, wherein the computer-readable code includes a list of existing native applications;
a client side component handling a special URL to launch a native application from a web page inside a browser;
a packaging unit to create a runnable bundle from an existing native application binary code installer automatically;
a caching unit to caching data needed for a said native application in the client machine;
a downloading unit to download native application bundle from remote server to client machine;
a running unit coupled with the client side component to launch and run a said native application from the cache unit completely from said client machine without performing any other native application program functions over a client server connection except for the downloading and caching the immediately needed parts from the native application bundle to the local machine and downloading other components and parts of the native application on demand while the native application runs.

12. The system of claim 11, further comprising a component selected from one or more selected from among:
a feedback component to allow users providing feedback during usage, a tracking unit to track application usage by users and detect user behaviors, or a payment unit to allow pay by use based on the tracked use of application software.

13. The system of claim 11, further comprising:
a community unit to create one community for each native application whose members comprise all users of the same application.

14. The system of claim 11, further comprising:
a data collection and analysis unit to collect and analyze user information during application use.

15. The system of claim 11, further comprising:
an advertising means to deliver ads along with the running application.

16. The system of claim 11, further comprising:
a social network unit to build up relationships among users using same or similar applications.

17. The system of claim 11, further comprising:
a real time communication means to allow users to communicate in real time with other users of the same application.

* * * * *